United States Patent [19]
Cochran et al.

[11] Patent Number: 6,032,699
[45] Date of Patent: Mar. 7, 2000

[54] FLUID DELIVERY PIPE WITH LEAK DETECTION

[75] Inventors: William S. Cochran, Stow, Ohio; John Ashley Graeber, Greensboro, N.C.

[73] Assignee: Furon Company, Aurora, Ohio

[21] Appl. No.: 09/031,786

[22] Filed: Feb. 27, 1998

Related U.S. Application Data

[63] Continuation-in-part of application No. 08/858,141, May 19, 1997.

[51] Int. Cl.[7] .................................................... F16L 55/00
[52] U.S. Cl. ......................... 138/104; 138/108; 138/112; 138/114; 138/116; 138/124
[58] Field of Search .................................. 138/104, 108, 138/112, 114, 116, 124, 149

[56] References Cited

U.S. PATENT DOCUMENTS

| | | |
|---|---|---|
| H594 | 3/1989 | Adorjan . |
| 3,332,446 | 7/1967 | Mann . |
| 3,490,496 | 1/1970 | Stearns . |
| 3,540,487 | 11/1970 | LaRusso . |
| 3,592,238 | 7/1971 | Scheffer . |
| 3,612,577 | 10/1971 | Pope . |
| 3,633,629 | 1/1972 | Rider . |
| 3,712,330 | 1/1973 | Davis . |
| 3,717,718 | 2/1973 | Schmidtchen . |
| 3,721,270 | 3/1973 | Wittgenstein . |
| 3,802,491 | 4/1974 | Plank, Jr. et al. . |
| 3,830,290 | 8/1974 | Thamasett et al. . |
| 3,863,679 | 2/1975 | Young . |
| 3,866,670 | 2/1975 | Cramer et al. . |
| 3,890,181 | 6/1975 | Stent et al. . |
| 3,905,398 | 9/1975 | Johansen et al. . |
| 4,052,862 | 10/1977 | Lemy . |
| 4,112,031 | 9/1978 | Gohlisch . |
| 4,121,623 | 10/1978 | Rhone . |
| 4,157,194 | 6/1979 | Takahashi ............................. 138/114 |
| 4,240,850 | 12/1980 | Arntz . |
| 4,259,553 | 3/1981 | Tanaka et al. . |
| 4,262,704 | 4/1981 | Grawey . |
| 4,315,408 | 2/1982 | Karl . |
| 4,338,812 | 7/1982 | Lindgren . |
| 4,343,333 | 8/1982 | Keister . |
| 4,410,013 | 10/1983 | Sasaki et al. . |
| 4,567,916 | 2/1986 | Antal et al. ............................. 138/104 |
| 4,644,780 | 2/1987 | Jeter . |
| 4,756,339 | 7/1988 | Buluschek . |
| 4,817,672 | 4/1989 | Broodman ............................. 138/114 |
| 4,826,423 | 5/1989 | Kemp et al. . |
| 4,898,212 | 2/1990 | Searfoss et al. . |
| 4,915,121 | 4/1990 | Rains . |
| 4,932,257 | 6/1990 | Webb . |

FOREIGN PATENT DOCUMENTS

| | | |
|---|---|---|
| 0 207 015 | 6/1986 | European Pat. Off. . |
| 62-23000 | 2/1987 | Japan . |
| WO 93/20372 | 10/1993 | WIPO . |

OTHER PUBLICATIONS

Enviroflex Brochure "The Flexible Double–Wall Piping System" dated Jan. 1990.

*Primary Examiner*—James F. Hook
*Attorney, Agent, or Firm*—Fay, Sharpe, Fagan, Minnich & McKee, LLP

[57] ABSTRACT

A secondary containment system for containing fuel leaks or leaks of other environmentally hazardous fluids includes a containment chamber and a detection system for detecting leaks. The containment system includes a fluid-carrying inner pipe and a containment pipe surrounding the inner pipe with an interstitial space being defined between the two pipes for containment of leaks. The interstitial space is pressurized with an inert fluid at a constant pressure greater than the pressure of the fluid flowing through the inner fluid-carrying pipe. Monitoring of the pressure of the inert fluid in the interstitial space triggers an alarm indicating that a leak has occurred. The location of the leak can be determined by the use of multiple pressure sensors. The containment pipe is reenforced to withstand pressures of at least 75 psi.

25 Claims, 6 Drawing Sheets

U.S. PATENT DOCUMENTS

| | | |
|---|---|---|
| 5,019,309 | 5/1991 | Brunnhofer . |
| 5,052,444 | 10/1991 | Messerly et al. . |
| 5,127,441 | 7/1992 | Rains . |
| 5,223,571 | 6/1993 | Igarashi et al. . |
| 5,267,670 | 12/1993 | Foster .................................... 138/104 |
| 5,297,896 | 3/1994 | Webb . |
| 5,343,738 | 9/1994 | Skaggs . |
| 5,494,374 | 2/1996 | Youngs et al. . |
| 5,551,484 | 9/1996 | Charboneau . |
| 5,590,981 | 1/1997 | Osborne . |
| 5,624,140 | 4/1997 | Allen et al. ............................ 138/114 |
| 5,775,842 | 7/1998 | Osborne ................................ 138/108 |
| 5,865,216 | 2/1999 | Youngs .................................. 138/137 |

FLUID DELIVERY PIPE WITH LEAK DETECTION

This application is a continuation-in-part of U.S. application Ser. No. 08/858,141 which was filed on May 19, 1997 and is still pending.

BACKGROUND OF THE INVENTION

The invention relates to a double-walled pipe assembly for transmitting a fluid and, more particularly, the invention relates to a double-walled pipe assembly with leak detection capabilities for safely conveying environmentally hazardous fluids.

While the invention is particularly applicable to double-walled pipe assemblies used in the petroleum, chemical, and natural gas industries, it should be appreciated that the pipe assembly can also be utilized in connection with all types of pipe installations in which leakage of an environmentally hazardous fluid may occur. The leakage of environmentally hazardous fluids in small amounts over long periods of time can produce a serious environmental hazard which is difficult to detect and difficult and expensive to clean up once it has ultimately been detected.

Conventional underground fluid piping systems, such as those utilized in service station environments, are typically made of steel, fiberglass, or plastic. Such systems generally include rigid straight lengths of pipe connected with T-fittings, elbows, connector fittings, union fittings, and the like. The assembly of these multiple components creates a piping system with many joints which are often prone to leakage. In addition, rigid piping systems are adversely affected by ground movement occurring during the life of the system which may cause failures of the pipes and connections.

Due to ever stricter environmental regulations propounded by the government concerning underground piping systems carrying environmentally hazardous fluids, piping manufacturers have developed a variety of secondary containment systems which are designed to prevent any fluid that may leak from a fluid transmitting pipe from escaping into the environment. One such approach for a secondary containment system involves lining a piping trench with a flexible membrane liner or semi-rigid trough to provide containment of a leaking fluid. This technique provides successful leak containment but does not provide a method of detecting leaks or determining a location of the leak in the piping line.

Another approach to the secondary containment problem utilizes a rigid, larger diameter pipe surrounding and enclosing a conventional rigid fluid supply pipe. With such an arrangement, the pipe fittings of the larger diameter containment pipe are an area where leakage of fuel to the environment may occur.

An additional type of secondary containment piping system utilizes spaced access chambers interconnected by a secondary containment pipe which provides a sealed housing around a flexible fluid supply pipe. The ends of the flexible fluid supply pipe are disposed within the access chambers and the flexibility of the inner supply pipe allows the inner pipe to be removed and replaced through the access chambers if a leak occurs. However, in practice, this removable inner supply pipe is difficult to remove because the pipe is resistant to the type of bending necessary to pull it out of the secondary containment pipe. This removable inner pipe system may include sensors for leak detection. However, this system does not allow identification of the location of a leak within the containment system.

A recent development in secondary containment of hazardous fluids employs a flexible co-axial piping system in which an outer pipe surrounds a fluid carrying inner pipe and the outer pipe contains any fluid which leaks from the inner pipe. These existing coaxial fuel delivery systems utilize a non-reinforced outer pipe which is capable of holding a maximum fluid pressure of about 5 psi (34.5 kPa) above atmospheric. Typical fuel pressures are much higher than this, for example fuel pressures from 30 to 60 psi (207 to 404 kPa) are common. Thus, a sudden failure of the inner pipe and the attendant fluid pressure on the outer pipe could cause a rupture of the outer containment pipe resulting in leakage of fuel to the environment. Thus, it would be desirable to provide a containment system which will contain both slow leaks and catastrophic failures of the inner pipe without damage to the environment.

Accordingly, it would be desirable to provide a secondary containment system for transmitting environmentally hazardous fluids which (1) prevents catastrophic failures, (2) provides leak detection, and (3) allows determination of the particular location of the leak in the piping system.

SUMMARY OF THE INVENTION

The present invention contemplates a new and improved secondary containment system which overcomes the drawbacks of the prior art including problems with known leak detection systems.

In accordance with one aspect of the present invention, a fluid-carrying pipe assembly includes an elongated flexible inner fuel-carrying pipe, an elongated flexible containment pipe surrounding the inner fuel-carrying pipe and containing any fuel leaks from the inner fuel-carrying pipe, and an interstitial space formed between the inner fuel-carrying pipe and the containment pipe. First and second ends of the containment pipe are sealed to the inner fuel-carrying pipe to form a containment chamber surrounding the inner pipe and including the interstitial space. A source of pressurized inert gas is connected to and pressurizes the containment chamber. A pressure sensor senses the pressure of the inert gas within the containment chamber to determine when a leak has occurred.

According to a more detailed aspect of the present invention, the first and second ends of the containment pipe are sealed to the inner fuel-carrying pipe by first and second boots which are in fluid-tight engagement with the fuel-carrying pipe and the containment pipe.

In accordance with a further more detailed aspect of the invention, the boots each include a port for connection of the first boot to the source of the pressurized inert gas and for connection of the second boot to the pressure sensor.

According to a further aspect of the present invention, a fluid transporting system with leak detection capabilities includes an inner fluid-carrying pipe for transporting an environmentally hazardous fluid, a containment pipe surrounding the inner fluid-carrying pipe and containing any fluid leaks from the inner fluid-carrying pipe, and an interstitial space formed between the inner fluid-carrying pipe and the containment pipe. First and second ends of the containment pipe are sealed to the inner fluid-carrying pipe to form a containment chamber for containing any fluid which leaks from the inner fluid-carrying pipe. A source of pressurized inert fluid is connected to the containment chamber and a pressure sensor senses the pressure of the inert fluid within the containment chamber to determine when a leak has occurred.

In accordance with an additional aspect of the invention, a coaxial fuel-carrying pipe assembly includes a primary fuel-carrying pipe, a secondary pipe surrounding the primary pipe, and a pressurizable interstitial space between the primary and secondary pipes. The secondary pipe includes an inner layer resistant to exposure to an interstitial fluid, an abrasion-resistant outer layer, and a reinforcing fibrous intermediate layer disposed between the inner layer and the outer layer. The intermediate layer prevents rupture of the secondary pipe upon pressurization to at least 75 psi (517 kPa).

One advantage of the present invention is the provision of a new and improved double walled pipe assembly.

Another advantage of the present invention is the provision of a fluid-carrying pipe assembly including an inner fluid-carrying pipe, an outer containment pipe, and a pressurized interstitial space between the inner and outer pipes.

Still another advantage of the present invention is the provision of a double-walled fluid conveying pipe with a pressure sensor for sensing the pressure within an interstitial space between the pipes to determine when a leak has occurred.

A further advantage of the present invention is the provision of a secondary containment system for fluid delivery in which a source of pressurized fluid is connected to a containment chamber between a first and a second coaxial pipe and a pressure sensor is arranged to detect pressure within the containment chamber to determine when a leak has occurred.

A still further advantage of the present invention is the provision of a pressurized secondary containment system with multiple pressure sensors to allow the determination of a location of a leak from an inner fluid carrying pipe into an outer containment pipe of the system.

A yet further advantage of the present invention is the provision of coaxial pipe system having a primary pipe, a secondary pipe surrounding the primary pipe—which secondary pipe is reinforced to prevent rupture upon pressurization—and a pressurizable interstitial space between the primary and secondary pipes.

An additional advantage of the present invention is the provision of a coaxial pipe system having a reinforced primary pipe and a reinforced secondary pipe surrounding the primary pipe. The primary and secondary pipes can be spaced from each other by spacing means which can include ribs or filament strands. If desired, the ribs can be secured to one or both of the primary and secondary pipes. If desired, the filament strands can be secured to one, both, or neither of the primary and secondary pipes.

Yet another additional advantage of the present invention is the provision of a coaxial pipe system having a primary pipe which is of a smaller external diameter than is the internal diameter of the surrounding secondary pipe. Each of the primary and secondary pipes is reinforced to prevent its collapse. Reinforcing the secondary pipe allows the removal of spacing means which would otherwise be necessary to hold the secondary pipe away from the primary pipe around a majority of its circumference, even when the coaxial pipe system is buried in the ground.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein.

DETAILED DESCRIPTION OF THE PREFERRED EMBODIMENTS

Figure 1:
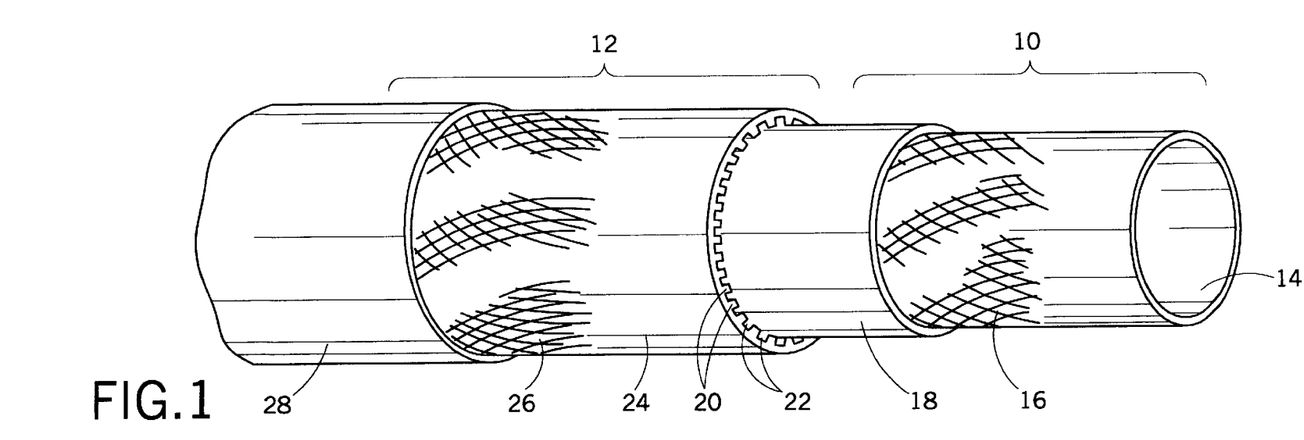
FIG. 1 is a perspective view of the inner and outer pipes of a double-walled pipe assembly according to a first preferred embodiment of the present invention with layers partially removed.

Referring now to the drawings wherein the showings are for the purposes of illustrating preferred embodiments of the invention only and not for purposes of limiting same, FIG. 1 illustrates a coaxial pipe assembly according to a first preferred embodiment of the present invention including an inner pipe 10 for transmitting environmentally hazardous fluids and an outer pipe 12 which forms part of a containment chamber around the inner pipe. One aspect of the invention involves the use of a pressurized inert gas in a space between the inner and outer pipes 10, 12 to detect the occurrence of leaks. While the double-walled pipe assembly is primarily designed for supply of fuel from an underground fuel tank to aboveground fuel dispensers, it should be appreciated that the coaxial pipe assembly can also be used with any other type of fluid transmission system in which leakage of fluid from the system would be environmentally hazardous. For example, leak detection of many fluids transported in the chemical manufacturing field and chemicals used in semi-conductor chip manufacturing would be desirable because these chemicals may be environmentally hazardous and/or expensive.

As shown in FIG. 1, in a preferred embodiment of the invention, the inner pipe 10 includes three layers. An inner fuel-resistant layer 14 is provided which is resistant to exposure to and permeation by the fuel or other environmentally hazardous fluid traveling through the inner pipe. A second layer 16 is formed of a fibrous reinforcing material formed in a braided or spiraling pattern surrounding the inner fuel-resistant layer 14. The reinforcing layer 16 is designed to reinforce the inner pipe sufficiently to contain the working pressure of the fuel. An outer layer 18 of the inner pipe 10 surrounds the reinforcing layer 16 and is impermeable to an inert gas which pressurizes a space between the inner and outer pipes 10, 12. The outer layer 18 of the inner pipe 10 is formed of a material suitable for intermittent or continuous exposure to ground water and fuel or other working fluid, as to well as the inert gas. The inner layer 14 and the outer layer 18 are bonded together through the open spaces in the reinforcing layer 16.

The outer pipe 12 surrounds the inner pipe 10 and is separated from the inner pipe by spacing means in the form of one or more ribs 20 extending from an inner surface of the outer pipe. The ribs 20 preferably extend longitudinally along the axis of the outer pipe and maintain the interstitial space or gap 22 between the inner and outer pipes. An inert gas is provided in the interstitial space to detect leakage from the inner pipe. Although the ribs 20 have been illustrated as extending inwardly from the outer pipe 12, it should be understood that the ribs may also be formed on the exterior surface of the inner pipe 10 and the same function will be achieved.

Figure 2:
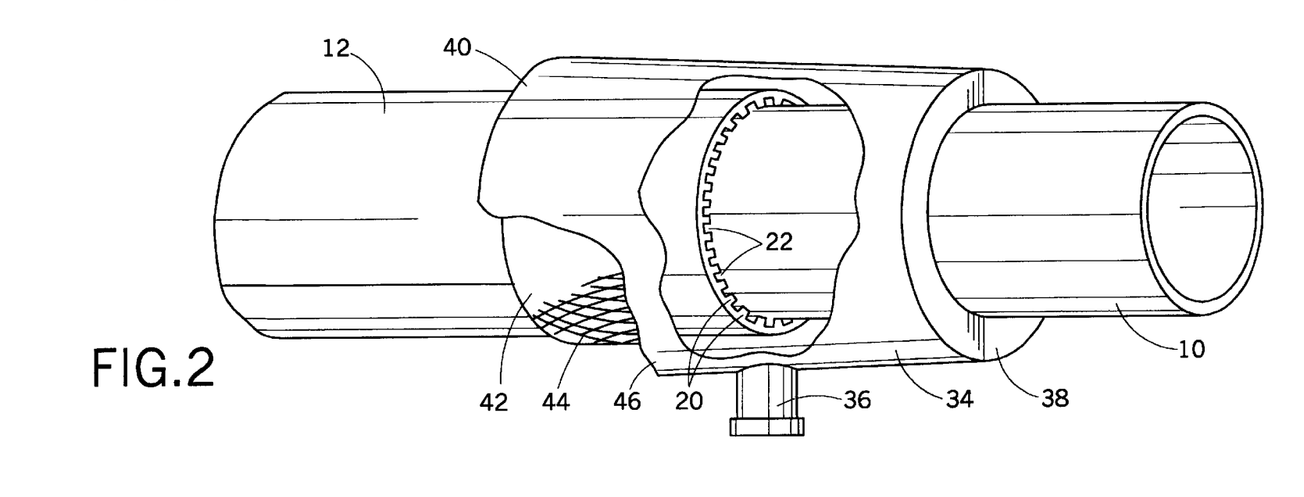
FIG. 2 is a perspective view of the inner and outer pipes of FIG. 1 and a boot located thereon with layers partially removed.

The ribs 20 as shown in FIGS. 1 and 2 are spaced apart a distance which is approximately equal to their width and are approximately square in cross section. However, other rib configurations may also be used such as the ribs shown in the cross-sectional view of FIG. 8 where the ribs have a rounded cross-sectional shape and each of the ribs has a width which is greater than the space between adjacent ribs. The size and shape of the ribs 20 may be varied depending on the particular application. Further, although the pipe has been described as coaxial, variations in the configurations of the inner and outer pipes 10, 12 and the ribs 20, particularly those occurring during extrusion, may cause the inner and outer pipes to be somewhat non-coaxial and the ribs to have a wavy appearance. Moreover, the ribs can also spiral around the outer periphery of the inner pipe instead of extending linearly therealong. It should be appreciated that the ribs 20 and 20' depicted in FIGS. 1 AND 8 do not adhere to the outer layer 18 of the inner pipe 10 because the inner layer 24 of the outer pipe 12 is made from a different material than is the outer layer 18 of the inner pipe 10.

Figure 9:
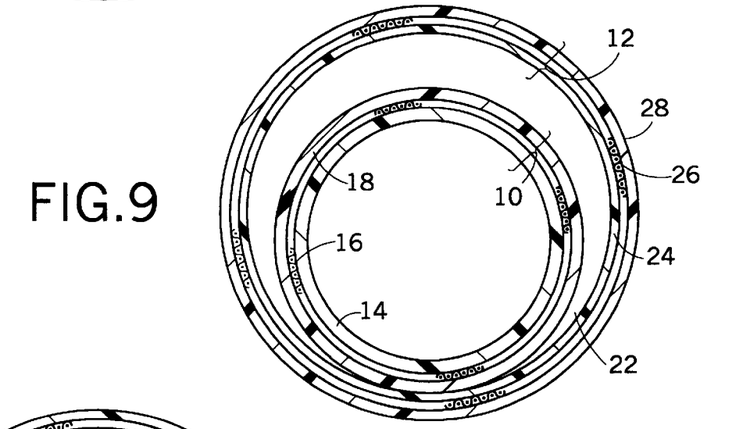
FIG. 9 is a cross-sectional view taken through the inner and outer pipes of a double-walled pipe assembly according to a third preferred embodiment of the present invention.

FIG. 9 illustrates another coaxial pipe configuration, which allows for the definition of the coaxial interstitial space 22 without the use of ribs. In the coaxial pipe configuration of FIG. 9, the inner pipe 10 has a smooth outer surface and the outer pipe 12 has a smooth inner surface. The outer diameter of the inner pipe 10 is significantly smaller than is the inner diameter of the outer pipe 12. In the preferred embodiment, the outer diameter of the inner pipe 10 is approximately 1.8 inches; whereas the smooth inner diameter of the outer pipe 12 is approximately 1.9 inches. This difference in the diameters defines the interstitial space 22 between the inner pipe 10 and the outer pipe 12 without the use of standoff ribs. Since the outer pipe 12 is reinforced, it does not collapse against the inner pipe 10, even when the pipe assembly is buried in the ground.

Figure 10:
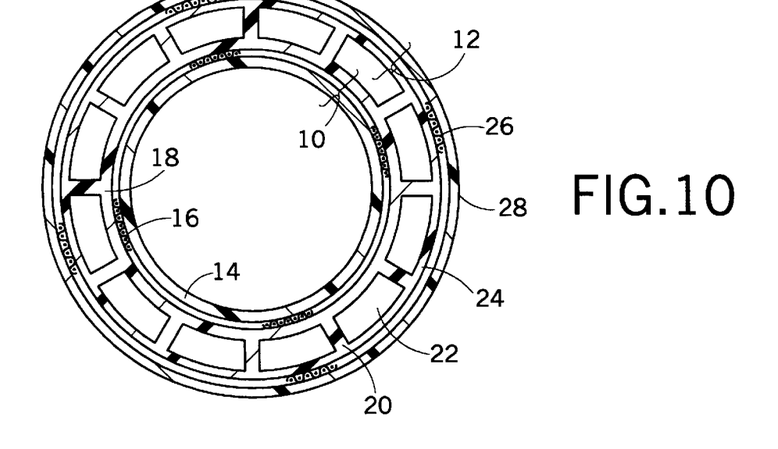
FIG. 10 is a cross-sectional view taken through the inner and outer pipes of a double-walled pipe assembly according to a fourth preferred embodiment of the present invention.

FIG. 10 illustrates yet another coaxial pipe configuration again showing the inner and outer pipes 10, 12 disposed substantially concentrically with each other. In the embodiment of FIG. 10, spacing means in the form of ribs 20 adhere to both the outer layer 18 of the inner pipe 10 and the inner layer 24 of the outer pipe 12. The ribs 20 support the inner pipe 10 and the outer pipe 12 in a spaced relationship to create the coaxial interstitial space 22. The outer pipe 12 has one or more radially extending spaced ribs 20 formed thereon and projecting inwardly from the inner layer 24 thereof. The ribs 20 extend radially to the outer layer 18 of the inner pipe 10. The distal ends of the ribs 20 are fused to the outer layer 18 of the inner pipe 10. The height of each of the ribs 20 from the inner layer 24 of the outer pipe 12 to the distal inner end of the rib 20 remains constant in the longitudinal direction of the outer pipe 12.

Preferably, the inner pipe 10, outer pipe 12 and ribs 20, as illustrated in the embodiment of FIG. 10, are extruded in the same operation at the same time so as to create a one-piece double-walled pipe assembly. The double-walled pipe assembly can be molded of any thermoplastic resin such as nylon 12, nylon 66, nylon 6, or the like, polyester, low density polyethylene (LDPE), high density polyethylene (HDPE), polypropylene, and combinations thereof.

Figure 11:
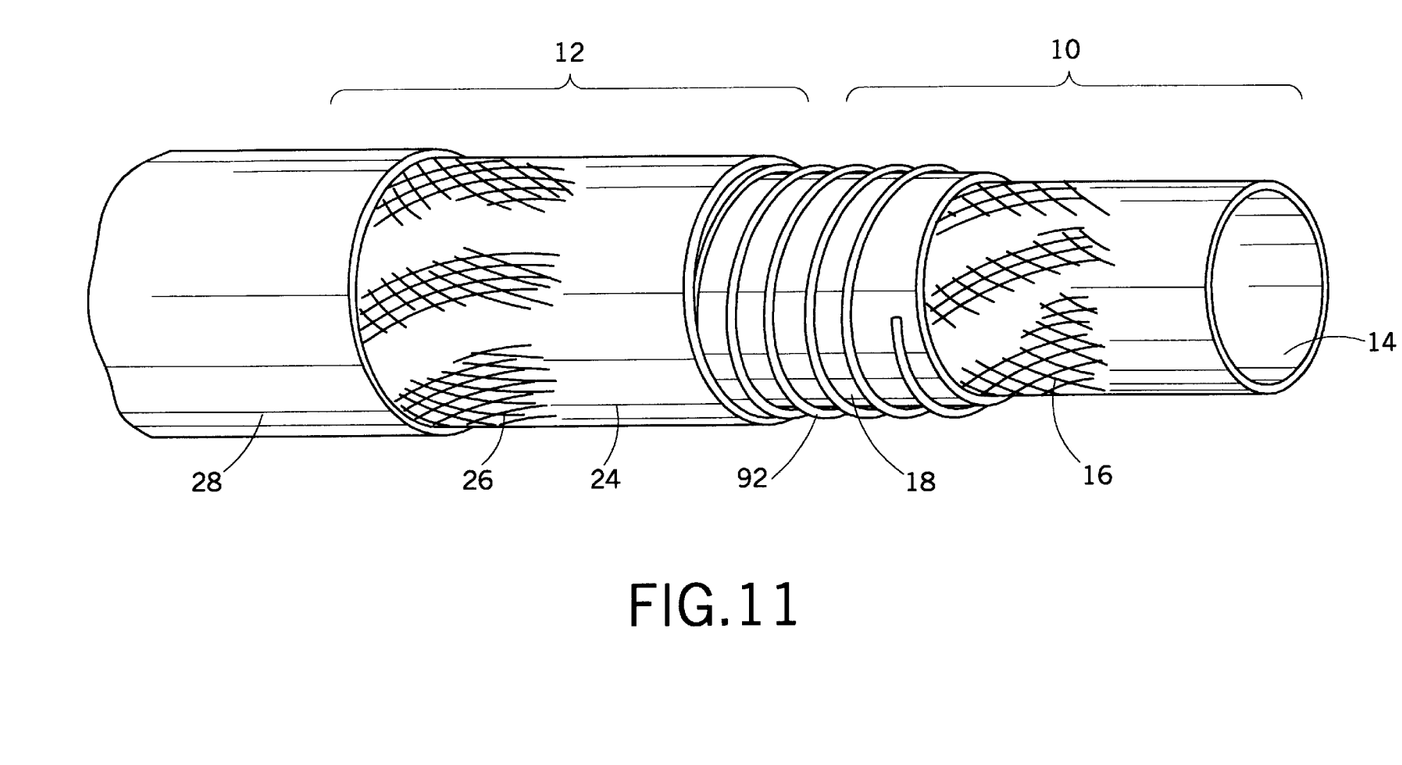
FIG. 11 is a perspective view of the inner and outer pipes of a double-walled pipe assembly according to a fifth preferred embodiment of the present invention with layers partially removed.

FIG. 11 illustrates yet another coaxial pipe configuration in which a spacing means in the form of a filament or strand 92 is used to maintain the interstitial space or gap 22 between the inner pipe 10 and the outer pipe 12. The filament is preferably a monofilament thread 92 is disposed around the outer layer 18 of the inner pipe 10 and is so located that each monofilament thread is helically wound around the outer layer 18 of the inner pipe 10.

Preferably, the monofilament thread 92 is formed of a thermoplastic material different from outer layer 18 of the inner pipe and from the inner layer 24 of the outer pipe so that the thread 92 is not bondable with either outer layer 18 or the inner layer 24. Alternatively, the monofilament thread 92 can be formed from a different material than the material of the outer layer 18 or the inner layer 24 but which can be selectively bonded to either the outer layer 18 or the inner layer 24. If desired, the monofilament thread 92 may be formed of a thermoplastic material compatible with outer layer 18 to permit thermal fusion bonding therebetween.

The monofilament thread 92 is preferably formed from a thermoplastic polymer. By the term "thermoplastic" it is meant any organic polymer, natural or synthetic, which in its final state is capable of being repeatedly softened by an increase in temperature and hardened by a decrease in temperature. Examples of suitable thermoplastic polymers include olefinic polymers, such as polyethylene, and copolymers such as ethylene-butylene copolymers, ethylene-hexene copolymers and the like.

The monofilament thread 92 can also be formed of a liquid crystalline polymer or a polymer mixture of liquid crystalline components. Such materials are known and described in Kunststoffe 78 (1988) 5, pages 411–417. Other types of suitable materials for the monofilament thread 92 would include glass, metal, animal or vegetable fiber yarns.

The filament or strand 92 can be wound on the inner hose 10 in a spiral wind or in any of the other known winding types such as S- and Z-type winds. Alternatively, the filament can simply extend in an axial direction along the length of the inner pipe.

A further embodiment of the invention would involve a spacing means in the form of a braided filament. The overlaps at each point a filament member crosses another filament member would be advantageous from the standpoint of providing more room for fluid to flow in the interstitial space defined between the inner and outer pipes 10 and 12.

As is best illustrated in FIG. 1, the outer pipe 12 is formed in a manner similar to the inner pipe 10 with a three layer reinforced construction. An inner layer 24 having the ribs 20 formed thereon is formed of a material which is extrudable and impermeable to the inert gas in the interstitial space 22, as well as any fluid which may leak thereinto. A second layer 26 is a reinforcing layer of a fibrous material which is formed in a braided or spiraled manner over the inner layer 24. The reinforcing layer 26 is designed to contain the forces exerted by the pressurized inert gas provided in the interstitial space 22. A third external layer 28 of the outer pipe 12 covers the reinforcing layer 26 and is formed of an abrasion-resistant material which is also resistant to prolonged exposure to ground water. The external layer 28 allows direct burial of the pipe assembly and prevents damage to the pipe as well as imparting additional structural strength to the pipe assembly. The inner layer 24 and the external layer 28 are preferably bonded together through the spaces in the reinforcing layer 26. The reinforcing layer 26 of the outer pipe 12 allows the outer pipe to withstand a sudden, large rupture of the primary pipe or inner pipe 10 and the attendant pressurized fluid spike into the interstitial space 22 without risk of a second failure allowing release of working fluid into the environment.

FIG. 2 illustrates a coaxial pipe configuration in which the inner pipe 10 extends from an end of the outer pipe 12 and a boot 34 is secured over an end of the outer pipe. The boot 34 is secured to an exterior of the inner pipe 10 at one end 38 and to an exterior of the outer pipe 12 at an opposite end 40. The boot 34 includes a port 36 through which the inert gas is introduced into or withdrawn from the interstitial space 22 between the inner and outer pipes 10, 12. The first and second ends 38, 40 of the boot 34 form fluid-tight seals with the inner and outer pipes 10, 12, respectively. This fluid tight seal may be maintained on the two ends of the boot 34 in any known manner such as by a band clamp, a worm gear clamp, or the like.

The boot 34 is preferably formed with a three layer construction with an inner layer 42 of the boot being resistant to damage due to exposure to the inert gas in the interstitial space 22 or to exposure to the fuel and/or ground water, an intermediate fibrous reinforcing layer 44 which is woven or spiraled around the inner layer, and an exterior abrasion-resistant layer 46. According to one preferred embodiment, the boot 34 is formed of two rubber layers and reinforced with an intermediate fabric layer. When a boot 34 is placed on each end of a segment of pipe in the manner illustrate in FIG. 2, the two boots and the interstitial space 22 together form a containment chamber around the inner pipe 10 for containment of leaks.

The materials for use in the inner and outer pipes 10, 12 and the boot 34 will vary depending on the fluid which is being transmitted through the inner pipe and the inert gas which is used as a detecting medium in the interstitial space 22. For example, the inner pipe 10 can be made of nylon, urethane, low density polyethylene (LDPE), high density polyethylene (HDPE), PVDF, or combinations thereof. The outer pipe 12 can be made of the same materials or combinations thereof. The boot 34 is preferably made of one or more types of rubber materials which have been found to be sufficiently flexible to serve the purpose of the boot.

Figure 8:
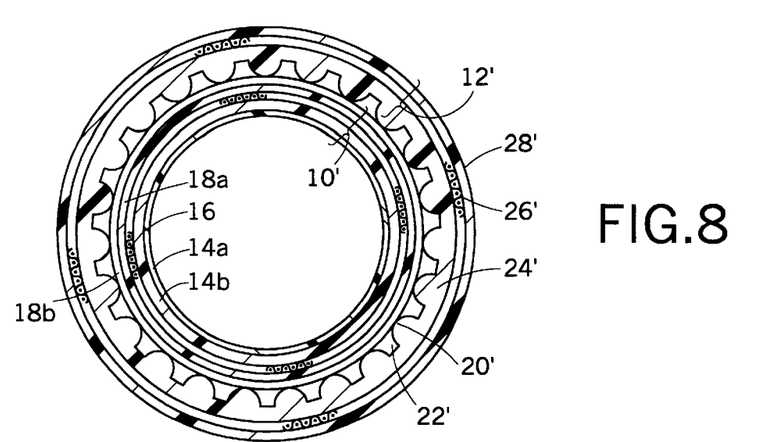
FIG. 8 is a cross-sectional view taken through the inner and outer pipes of a double-walled pipe assembly according to another preferred embodiment of the present invention.

FIG. 8 illustrates one preferred embodiment of a coaxial pipe assembly according to the present invention. For ease of understanding and appreciation of this embodiment of the invention, like components are identified by like numerals with a primed (') suffix and new components are identified by new numerals. In FIG. 8, an inner pipe 10', is constructed of a core tube 14' coextruded with a PVDF lining 14a and fuel-resistant urethane backing 14b, and a polyester yarn woven reinforcement 16' over the coextruded core tube 14'. A nylon sheath 18a surrounds the reinforcement 16', and an HDPE over layer material 18b surrounds the sheath. One or more additional polyester yarn reinforcement layers (not shown) can also be provided. These materials are merely examples of the types of materials which may be used for the inner pipe 10'. The materials used for the three layers 24', 26', and 28' of the outer pipe 12' may differ somewhat from those of the inner pipe 10' depending on the application. Many other materials and combinations of materials may be used without departing from the scope of the invention.

It should be appreciated that the ribs 20' of the outer pipe 12 contact the outermost layer 18b of the inner pipe 10' in a frictional engagement so as to prevent a removal of the inner pipe 10' from the outer pipe 12'.

The burst strength of the inner pipe 10 is preferably on the order of 600 to 700 psi (5516 to 6205.5 kPa) for a 1½ inch (3.81 cm) inner diameter pipe and the working strength is preferably approximately 150 psi (1034 kPa). The working strength of the outer pipe 12 and of the boot 34 are 60 to 90 psi (414 to 621 kPa) preferably approximately 75 psi (517 kPa) and the burst strength is 300 to 450 psi (2069 to 3103 kPa). Normally, the fuel is pumped through the inner pipe 10 at approximately 30 to 60 psi (207 to 414 kPa) with spikes up to 100 psi (689.5 kPa). The inert gas is pumped into the interstitial space 22 between the inner and outer pipes 10, 12 at approximately 75 psi (517 kPa). In order that leaks be easily detected, it is important that the pressure of the inert gas be different from that of the fuel. Preferably, the pressure of the inert gas is between 10 and 20 psi (69 and 138 kPa) greater than the pressure of the fuel. In the event of a failure of the inner pipe 10, the higher pressure in the interstitial space 22 will cause the inert gas to leak into the inner pipe rather than allowing fuel from the inner pipe to leak into the outer pipe 12 and possibly into the environment.

The inert gas for use in the interstitial space 22 to detect leaks may be any gas which will not react with the fluid within the inner pipe. For a fuel carrying system, the inert gas is preferably nitrogen or carbon dioxide. In place of an inert gas, a fluid may also be used in some systems, for example, water may be used.

According to an alternative embodiment of the invention, a vacuum may be used in the interstitial space 22 in place of the pressurized inert fluid. However, a vacuum is disadvantageous from the standpoint that it will tend to draw the fluid from the inner pipe 10 through any openings in the inner pipe into the outer pipe 12.

Figure 3:
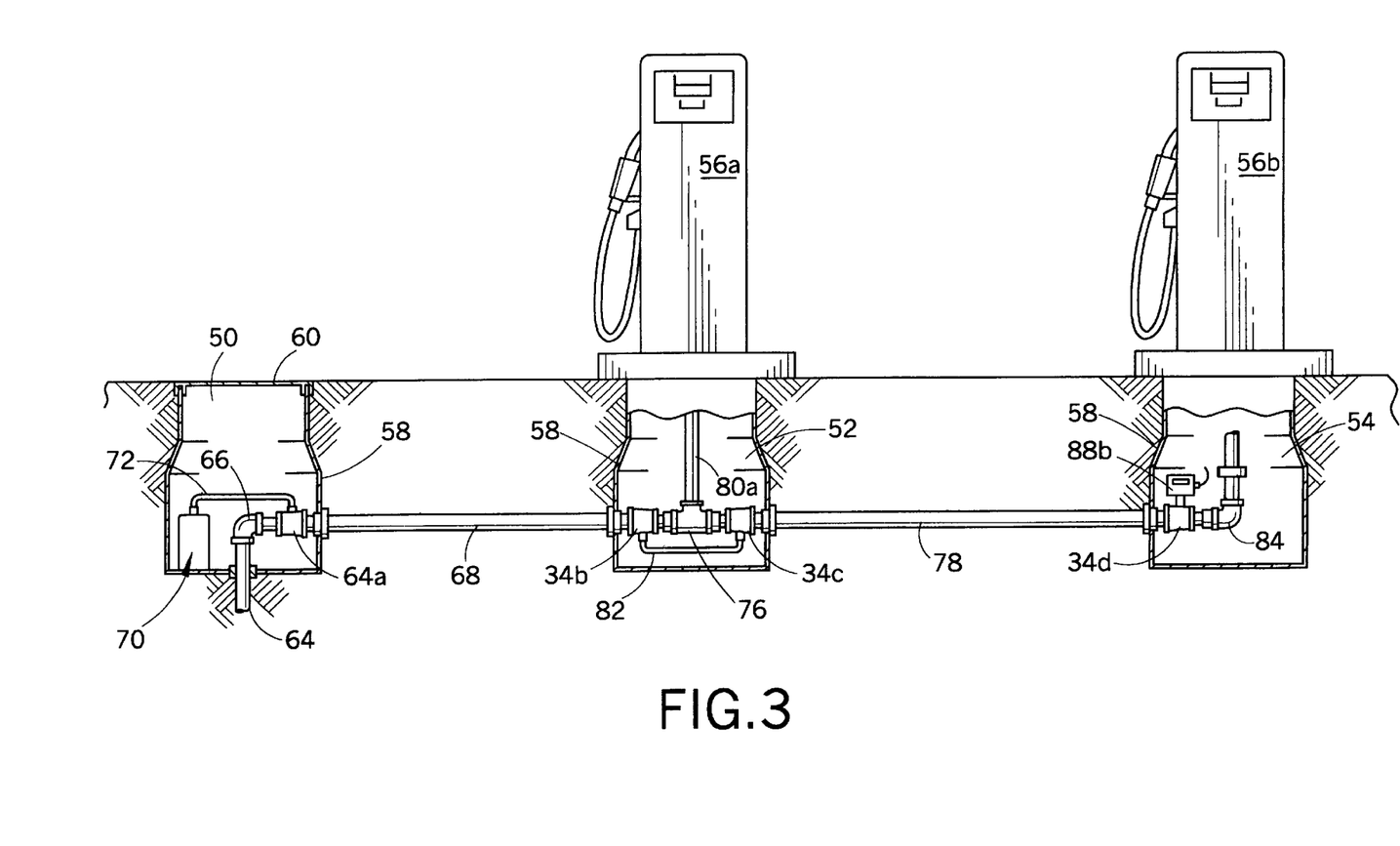
FIG. 3 is a side elevational view of a fluid delivery and leak containment system according to a first preferred embodiment of the present invention.

A containment system according to one preferred embodiment of the present invention illustrated in FIG. 3 includes a first sump 50, a second sump 52, and a third sump 54. The sumps are interconnected by the double-walled coaxial pipe described above with reference to FIG. 1 for delivering fuel from an underground fuel tank (not illustrated) to two aboveground dispensers 56a, 56b. Each of the sumps 50, 52, 54 includes an open topped underground containment vessel 58 and a cap 60 positioned at ground level to permit easy access to the sump.

Figure 4:
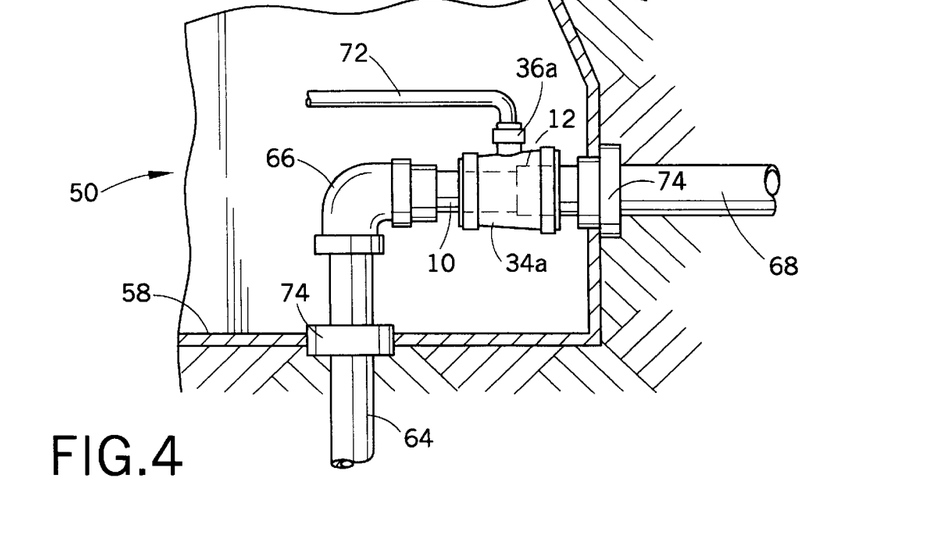
FIG. 4 is an enlarged side elevational view of a first sump of FIG. 3.

An enlarged view of a portion of the first sump 50 is shown in FIG. 4. Within the first sump, which can be termed a tank sump 50, is disposed a pipe 64 a lower end of which is connected to an underground fuel tank (not shown). Generally, the fuel is pumped from the underground fuel tank to the dispensers 56a, 56b, by a conventional pump (not shown) which is located within the tank sump 50. An upper end of the pipe 64 is connected by an elbow joint 66 to the inner pipe 10 of a first pipe segment 68. The exterior of the outer pipe 12 of the first pipe segment 68 is sealed by a boot 34a to the exterior of the inner pipe, and a port 36a of the boot is connected by a connecting pipe 72 to a constant pressure source of an inert gas 70. The inert gas is delivered by the connecting pipe 72 and the boot 34a to the interstitial space 22 between the inner and outer pipes 10, 12. Seals 74 are provided at the openings in the containment vessel 58 to prevent any fuel which may have leaked into the containment vessel from escaping from the containment vessel into the surrounding environment.

Figure 5:
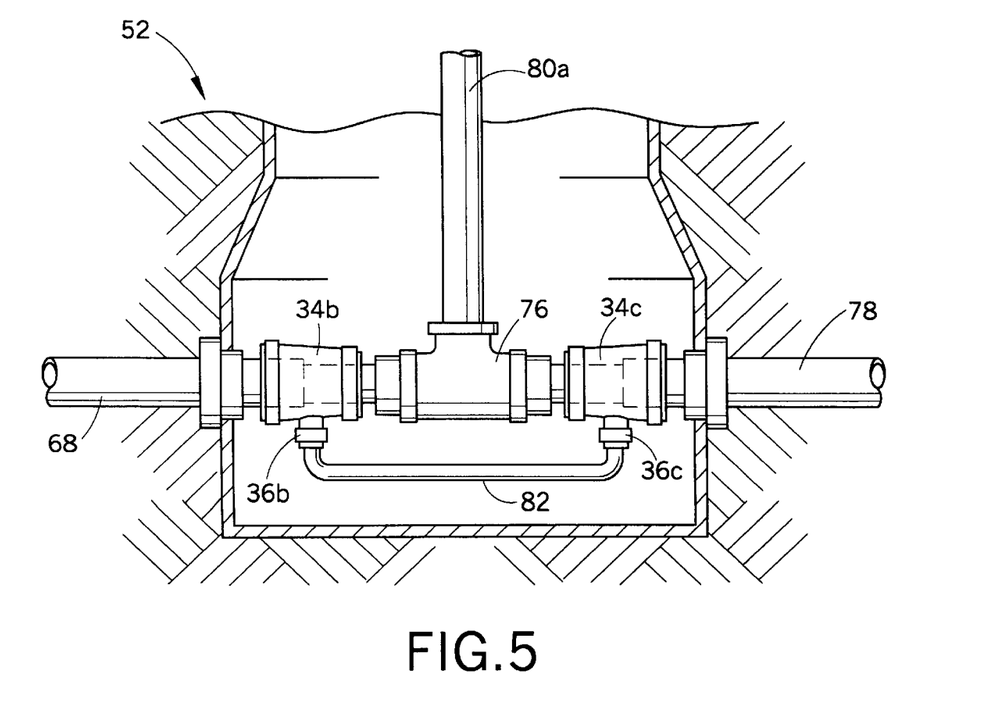
FIG. 5 is an enlarged side elevational view of a second sump of FIG. 3.

FIG. 5 is an enlarged side view of the second or dispenser sump 52 in which the first pipe segment 68 is connected for delivery of fuel to the first fuel dispenser 56a. The first pipe segment 68 delivering fuel from the underground fuel tank is connected by a T-joint 76 to a second pipe segment 78 and to a pipe 80a supplying fuel to the first fuel dispenser 56a. The T-joint 76 is a conventional pipe fitting for connecting plastic pipes. Boots 34b, 34c are secured over the ends of the outer pipes of the first and second pipe segments 68, 78. Respective ports 36b, 36c of the two boots within the second sump 52 are connected to a bypass pipe 82. The boots 34b, 34c allow the passage of the inert gas from the interstitial space 22 in the first pipe segment 68 to the interstitial space in the second pipe segment 78 through the bypass pipe 82 which bypasses the T-joint 76.

It should be appreciated that the bypass pipe 82 is made from a suitable conventional hose—which can have one or more layers as may be desired—that can withstand the inert fluid which circulates through the containment chamber between the inner and outer pipes and the boots. Since the bypass pipe 82 is of relatively small diameter in comparison to the diameter of the inner and outer pipes, it can withstand the pressures to which the reenforced outer pipe is exposed by the pressurized inert fluid.

Figure 6:
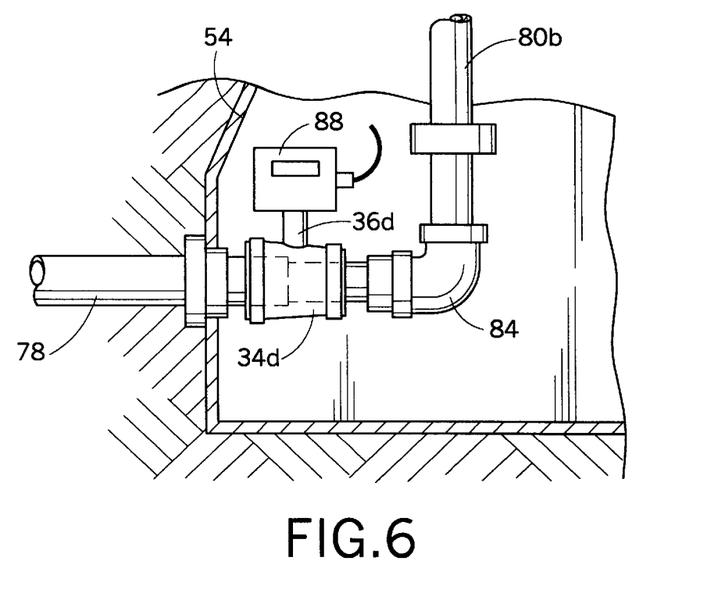
FIG. 6 is an enlarged side elevational view of a third sump of FIG. 3.

The third sump 54 is shown in the enlarged view of FIG. 6 and includes an elbow joint 84 which connects the second pipe segment 78 to a pipe 80b for delivering fuel to the fuel dispenser 56b. A boot 34d seals the outer pipe to the inner pipe at the end of the second pipe segment 78 and a port 36d of the boot 34d is connected to a pressure sensor 88.

In operation, fluid communication is provided from the constant pressure source 70 through the boots 34a–34d, the interstitial space in the first pipe segment 68, the bypass pipe 82, and the interstitial space in the second pipe segment 78 to the pressure sensor 88. Once the fuel containment system is assembled and properly connected without leaks in any of the pipe segments or connections, the pressure at the pressure sensor 88 will be the same as the pressure supplied by the constant pressure source 70. However, when a leak occurs in any of the pipe segments or connections, the pressure sensor 88 will indicate a drop in pressure because the pressure in interstitial space is higher than the pressure in inner hose. The pressure sensor 88 will sense a leak in either the inner pipe or the outer pipe in either of the two pipe segments 68, 78 as well as any leaks in the boots 34a–34d or the connections between the boots and the pipe segments. Leaks in the elbow joints 66, 84, the T-joint 76, or the connecting pipes 80a, 80b, and 64 will not be detected by the leak detection system. However, these particular undetected leaks can be easily observed within the sumps. In addition, there is a small portion of the inner pipe at each end of the pipe segments 68, 78 which extends out of the boot to allow connection to the appropriate connector. Leaks in this portion of the inner pipe are contained by the sump and are easily detectable upon visual examination but will not be detected by a corresponding pressure drop.

The pressure sensor 88 is preferably connected to a visual or audible warning signal or alarm which is activated to indicate the presence of a fuel leak. The sounding of an alarm may indicate a leak in either the inner pipe 10 or the outer pipe 12, either of which is correctable by replacement of the entire pipe segment.

Figure 7:
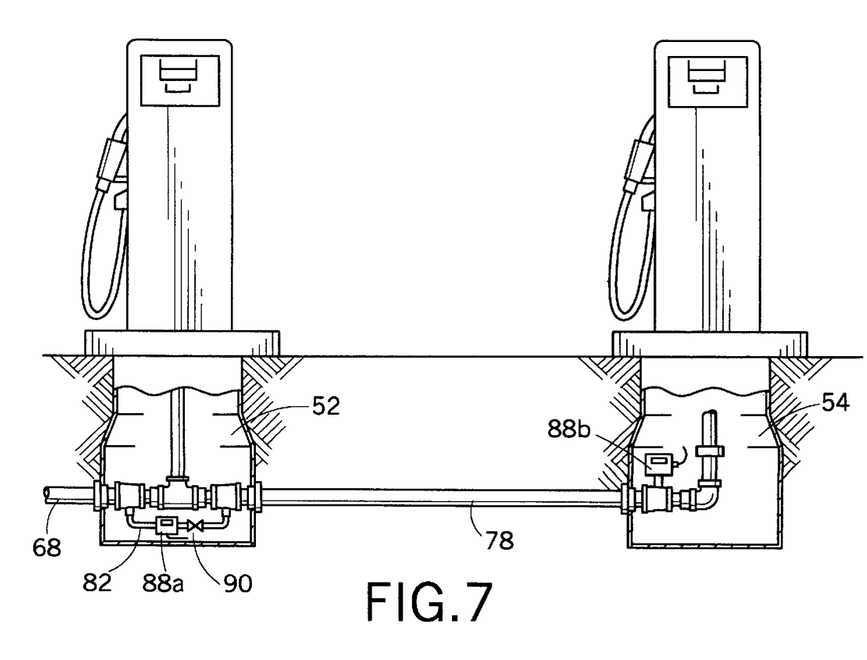
FIG. 7 is a side elevational view of a portion of a fluid delivery and leak containment system according to a second preferred embodiment of the present invention.

FIG. 7 illustrates an alternative embodiment of the invention in which each pipe segment 68, 78 is provided with a separate pressure sensor 88a, 88b. A one-way valve 90 is positioned between successive pipe segments to isolate the pressure contained in the interstitial space of each pipe segment. Thus, each pressure sensor 88a, 88b measures the pressure of an associated pipe segment 68, 78. Accordingly, when a pressure drop is detected at pressure sensor 88b, the location of the pressure drop can be determined to be within the second pipe segment 78. When a pressure drop is detected by both pressure sensors 88a and 88b, the location of the pressure drop and, thus, the leak can be determined to be within the first pipe segment 68. Although the pressure sensor 88a and the one-way valve 90 have been illustrated to be mounted in the bypass pipe 82 of the second sump 52, it should be understood that the location and number of pressure sensors and one-way valves can be varied to increase or decrease the accuracy with which the location of a leak is detected. In addition, a conventional microprocessor (not illustrated) may be connected to the pressure sensors 88a, 88b to automatically pinpoint the location of the leak and identify this location to the user.

Should a leak be detected in either of the first or second pipe segments 68, 78, the entire pipe segment can be dug up, disconnected from the two sumps, and replaced. Alternatively, if the inner pipe 10 is of suitably smaller diameter than the outer pipe—that is, if the interstitial space is sufficiently large to provide minimal friction between the pipes—then the inner pipe may be removable from the outer pipe 12 so that the inner pipe alone may be replaced. It should be appreciated that, in this embodiment, the ribs of the outer pipe would not likely be in contact with the outer periphery of the inner pipe around the entire circumference of the inner pipe. Rather, there would only be spot contact between selected ribs of the outer pipe and a selected portion of the outer surface of the inner pipe.

The invention has been described with reference to the preferred embodiments. Obviously, modifications and alterations will occur to others upon a reading and understanding of this specification. The invention is intended to include all such modifications and alterations insofar as they come within the scope of the appended claims or the equivalents thereof.

Having thus described the invention, we claim:

1. A fluid-carrying pipe assembly comprising:

an elongated flexible inner fluid-carrying pipe;

an elongated flexible containment pipe surrounding the inner fluid-carrying pipe and containing any fluid leaks from the inner fluid-carrying pipe;

an interstitial space formed between the inner fluid-carrying pipe and the containment pipe;

first and second ends of the containment pipe sealed to the inner fluid-carrying pipe to form a containment chamber surrounding the inner pipe and including the interstitial space;

a source of pressurized inert gas connected to and pressurizing the containment chamber; and a pressure sensor for sensing the pressure of the inert gas within the containment chamber to determine when a leak has occurred in the inner fluid-carrying pipe, the pressure of the inert gas within the containment chamber greater than the pressure of the fluid within the inner fluid-carrying pipe.

2. The fluid-carrying pipe assembly according to claim 1, wherein the first and second ends of the containment pipe are sealed to the inner fluid-carrying pipe by first and second boots which are in fluid-tight engagement with the fluid-carrying pipe and the containment pipe.

3. The fluid-carrying pipe assembly according to claim 2, wherein the boots each include an inner fluid-resistant layer, a fibrous reinforcing layer, and an outer layer.

4. The fluid-carrying pipe assembly according to claim 2, wherein the boots each include a port for connection of the first boot to the source of pressurized inert gas and for connection of the second boot to the pressure sensor.

5. The fluid-carrying pipe assembly according to claim 1, wherein the fluid-carrying pipe includes an inner layer of a fluid-resistant material, a fibrous reinforcing layer surrounding the inner layer, and an outer layer surrounding the fibrous layer which is resistant to penetration by the inert gas.

6. The fluid-carrying pipe assembly according to claim 1, wherein the containment pipe includes an inner layer of a material which is resistant to penetration by the inert gas, a fibrous reinforcing layer surrounding the inner layer, and an abrasion-resistant outer layer.

7. The fluid-carrying pipe assembly according to claim 6, wherein the fibrous reinforcing material layer of the containment pipe prevents rupture of the containment pipe upon pressurization up to at least 75 psi (517 kPa).

8. A secondary containment system for fuel delivery comprising:
   a fuel storage tank;
   a first fuel dispenser;
   a first coaxial fuel delivery pipe for delivering fuel from the fuel storage tank to the first fuel dispenser, the first coaxial fuel delivery pipe including an inner pipe for transporting fuel, an outer pipe for containment of fuel leaks, and an interstitial space between the inner and outer pipes;
   a first sump in which the first coaxial fuel delivery pipe is connected to the fuel storage tank;
   a second sump in which the first coaxial fuel delivery pipe is connected to the first fuel dispenser;
   a seal for sealing each end of the interstitial space in the first coaxial fuel delivery pipe;
   a source of pressurized fluid connected to the interstitial space in the first coaxial fuel delivery pipe for delivery of the pressurized fluid to the interstitial space; and
   a first pressure sensor arranged to detect pressure within the interstitial space in the first coaxial fuel delivery pipe to determine whether a leak has occurred in the inner pipe of the fuel delivery pipe, the pressure of the fluid in the interstitial space greater than the pressure of the fuel in the inner pile.

9. The secondary containment system according to claim 8, further comprising:
   a second coaxial fuel delivery pipe for delivering fuel from the fuel storage tank to a second fuel dispenser, the second coaxial fuel delivery pipe including an inner pipe for transporting fuel, an outer pipe for containment of fuel leaks, and a interstitial space between the inner and outer pipes;
   wherein the source of pressurized fluid is connected to the interstitial space in the second coaxial fuel delivery pipe for delivery of the pressurized fluid to the interstitial space in the second coaxial fuel delivery pipe; and
   a second pressure sensor arranged to detect a pressure within the interstitial space of the second coaxial fuel delivery pipe to determine whether a leak has occurred in the second coaxial fuel delivery pipe.

10. The secondary containment system according to claim 9, wherein the first coaxial fuel delivery pipe and the second coaxial delivery pipe are arranged in series and the first and second pressure sensors detect the occurrence and location of a leak.

11. The secondary containment system according to claim 10, wherein the interstitial spaces of the first coaxial fuel delivery pipe and the second coaxial fuel delivery pipe are connected by a bypass pipe having a one way valve.

12. A fluid transporting system with leak detection capabilities comprising:
   an inner fluid-carrying pipe for transporting an environmentally hazardous fluid;
   a containment pipe surrounding the inner fluid-carrying pipe and containing any fluid leaks from the inner fluid-carrying pipe;
   an interstitial space formed between the inner fluid-carrying pipe and the containment pipe;
   first and second ends of the containment pipe sealed to the inner fluid-carrying pipe to form a containment chamber for containing any fluid which leaks from the inner fluid-carrying pipe, the containment chamber including the interstitial space;
   a source of pressurized inert fluid connected to the containment chamber; and
   a pressure sensor for sensing the pressure of the inert fluid within the containment chamber to determine when a leak has occurred in the inner fluid-carrying pipe, the pressure of the inert fluid within the containment chamber greater than the pressure of the fluid within the inner fluid-carrying pipe.

13. The fluid transporting system according to claim 12, wherein the environmentally hazardous fluid is fuel and the inert fluid is pressurized nitrogen gas.

14. The fluid transporting system according to claim 12, wherein the first and second ends of the containment pipe are sealed to the inner fluid-carrying pipe by first and second boots in fluid-tight engagement with the fluid-carrying pipe and the containment pipe, and the boots each include a port for connection of the first boot to the source of pressurized inert fluid and for connection of the second boot to the pressure sensor.

15. A coaxial fluid conveying pipe assembly comprising:
   a primary fluid conveying pipe for conveying a fluid;
   a secondary containment pipe surrounding the primary pipe, the secondary pipe including an inner layer resistant to exposure to an interstitial fluid, an abrasion-resistant outer layer, and a reinforcing fibrous intermediate layer disposed between the inner layer and the outer layer, the intermediate layer preventing rupture of the secondary pipe upon pressurization up to at least 75 psi (517 kPa); and
   a pressurizable interstitial space defined between the primary pipe and the secondary pipe, the interstitial space pressurized so that the pressure within the interstitial space is greater than the pressure within the primary pipe.

16. The coaxial fluid conveying pipe assembly according to claim 15, further comprising:
   sealing means for sealing opposite ends of the interstitial space; and,
   means for delivery of an inert fluid to the interstitial space.

17. The coaxial fluid conveying pipe assembly according to claim 16, wherein the sealing means comprises a boot sealed to an exterior surface of the primary pipe and to an exterior surface of the secondary pipe and including a port.

18. The coaxial fluid conveying pipe assembly according to claim 15, wherein the primary fluid conveying pipe includes an inner core with an innermost surface resistant to exposure and permeation of a fluid carried in the fluid conveying pipe, a primary pipe sheath surrounding the inner core and having an exterior layer, and a reinforcing fibrous intermediate layer disposed between the inner core and the sheath.

19. The coaxial fluid conveying pipe assembly according to claim 15 further comprising at least one rib extending between said secondary containment pipe and said primary fluid conveying pipe.

20. The coaxial fluid conveying pipe assembly according to claim 19 wherein said at least one rib is of one piece with one of said primary and secondary pipes and is in frictional engagement with another of said primary and secondary pipes.

21. The coaxial fluid conveying pipe assembly according to claim 19 wherein said at least one rib is of one piece with both said primary and secondary pipes.

22. The coaxial fluid conveying pipe assembly according to claim 21 wherein said primary pipe, said secondary pipe, and said at least one rib are formed as a single extruded unit.

23. The coaxial fluid conveying pipe assembly according to claim 15 further comprising a filament disposed between said primary pipe and said secondary pipe.

24. The coaxial fluid conveying pipe assembly according to claim 23 wherein said filament is formed of a material selected from the group consisting of a thermoplastic polymer, a liquid crystalline polymer and a polymer mixture of liquid crystalline polymers.

25. The coaxial fluid conveying pipe assembly according to claim 23 wherein said filament is wound around the periphery of said primary pipe.

* * * * *